United States Patent
Bush et al.

(10) Patent No.: US 12,073,206 B2
(45) Date of Patent: Aug. 27, 2024

(54) METHODS FOR UPDATING AN ELECTRONIC DEVICE

(71) Applicant: Lexmark International, Inc., Lexington, KY (US)

(72) Inventors: Stephen Porter Bush, Richmond, KY (US); Timothy John Rademacher, Richmond, KY (US); Jennifer Topmiller Williams, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 105 days.

(21) Appl. No.: 17/829,874

(22) Filed: Jun. 1, 2022

(65) Prior Publication Data

US 2023/0153104 A1     May 18, 2023

Related U.S. Application Data

(63) Continuation of application No. 17/727,741, filed on Apr. 23, 2022.

(60) Provisional application No. 63/256,615, filed on Oct. 17, 2021.

(51) Int. Cl.
    *G06F 8/654*     (2018.01)
    *G06F 21/44*     (2013.01)
    *G06F 21/57*     (2013.01)

(52) U.S. Cl.
    CPC .............. *G06F 8/654* (2018.02); *G06F 21/44* (2013.01); *G06F 21/572* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 6,360,362 B1* | 3/2002 | Fichtner | G06F 8/65 713/100 |
| 9,734,311 B1* | 8/2017 | Righi | G06F 21/32 |
| 2003/0217358 A1* | 11/2003 | Thurston | G06F 8/60 717/174 |
| 2004/0186690 A1* | 9/2004 | Swanson | H05K 1/0266 702/187 |
| 2011/0269437 A1* | 11/2011 | Marusi | H04L 65/756 455/414.1 |

(Continued)

OTHER PUBLICATIONS

Kagita, "A framework for intelligent IoT firmware compliance testing", 2021, ScienceDirect (Year: 2021).*

*Primary Examiner* — Hossain M Morshed (57) ABSTRACT

A method for updating an imaging device is described comprising, receiving update information comprising a compatibility update filter indicating which generations of supply item are compatible with the imaging device, and updating a compatibility filter of the imaging device based on the update information, the compatibility filter configured to control which generations of supply item are classified as compatible with the imaging device. An imaging device is also described that comprises firmware and a memory, the memory storing a compatibility filter configured to control which generations of supply item are classified as compatible, wherein the firmware is configured to read the compatibility filter, and the imaging device is configured to update the compatibility filter. Finally, an imaging device supply item is also described.

13 Claims, 3 Drawing Sheets

(56) References Cited

U.S. PATENT DOCUMENTS

| | | | |
|---|---|---|---|
| 2011/0302347 A1* | 12/2011 | Schubert | G06F 13/102 |
| | | | 710/303 |
| 2015/0020060 A1* | 1/2015 | Bandakka | G06F 8/61 |
| | | | 717/171 |
| 2015/0317150 A1* | 11/2015 | Suwabe | G06F 8/65 |
| | | | 717/168 |
| 2017/0147322 A1* | 5/2017 | Vopni | G06F 8/654 |
| 2019/0179627 A1* | 6/2019 | Sugiyama | H04L 67/01 |
| 2019/0187972 A1* | 6/2019 | Hirose | G06F 8/65 |
| 2019/0227876 A1* | 7/2019 | Dardis | G06F 8/71 |
| 2019/0243637 A1* | 8/2019 | Nachimuthu | G06F 8/656 |
| 2020/0012488 A1* | 1/2020 | Koval | G06F 8/71 |
| 2020/0409685 A1* | 12/2020 | Shimomoto | G06F 8/65 |
| 2021/0096837 A1* | 4/2021 | Kim | G06F 21/74 |
| 2021/0117176 A1* | 4/2021 | Watt | G06F 8/71 |
| 2022/0004379 A1* | 1/2022 | Su | G06F 9/44589 |
| 2022/0147336 A1* | 5/2022 | Joshi | H04L 41/147 |
| 2022/0188419 A1* | 6/2022 | Stremlau | G06F 8/65 |

* cited by examiner

METHODS FOR UPDATING AN ELECTRONIC DEVICE

CROSS REFERENCE TO RELATED APPLICATIONS

This application is a continuation application of U.S. patent application Ser. No. 17/727,741, filed Apr. 23, 2022, entitled "Methods for Updating an Electronic Device," which claimed priority to a provisional application of U.S. Patent Application No. 63/256,615, filed Oct. 17, 2021, entitled "Methods for Supplies Generation and Countermeasure Management in a Printer," the content of which are hereby incorporated by reference in its entirety.

BACKGROUND

1 Technical Field

The present disclosure generally relates to methods and systems for updating an electronic device using a supply item, and, more particularly, methods and systems for updating an imaging device using a supply item.

2. Description of the Related Art

In electronic systems, it is often desirable to confirm the authenticity of a component of the electronic system to ensure that the entire system operates as designed. Non-authentic components employ various techniques to mimic the behavior of authentic components. This may include copying the authentic component's circuits and memory contents in order to duplicate authentication algorithms or encrypted communication between the component and the rest of the electronic system. This is particularly important in printing systems where it is desirable to confirm the authenticity of a supply component of the printing system to ensure correct operation.

It is often desirable to change the behavior of an electronic system during its lifecycle, by installing a software or firmware update. In this way, functionality and/or authentication criteria for components may be changed or added. For example, changes in imaging device functionality may include deployment of latent firmware functions (e.g., countermeasures, or additional security authentication with supply security devices), or updates to compatibility settings that govern which supplies may be installed in the imaging device. In these situations, it is generally assumed that firmware updates by the end user will not be performed to an acceptable extent.

Methods for accomplishing these changes outside of user-implemented firmware updates have typically been limited to timer-based mechanisms, wherein the electronic device contains a tamper-resistant clock that records the total elapsed uptime since a reference date/time. The electronic system's firmware monitors this clock value and deploys functions at certain times, typically based on a table of stored trigger values. However, a key disadvantage of this method is that the timer can be vulnerable to tampering (either rolling the timer forward so that the latent functions are prematurely discovered by an adversary or rolling it backward in order to disable the functions altogether. Another disadvantage is that once the electronic device is shipped, there is no way to alter its firmware's latent functions' deployment (order, trigger time/date, etc.) other than a user-implemented firmware update.

Accordingly, there is a need for improved systems and methods for updating electronic devices.

SUMMARY

The present disclosure provides example methods and systems that may be implemented in any general electronic system or specifically in an imaging/printing device/system to thwart the use of non-authentic components.

There is provided a method for updating an imaging device, the method comprising: receiving, by the imaging device, update information from a memory of a supply item connected to the imaging device, the update information comprising an update value, and updating a firmware variable of the imaging device based on the update information.

In the traditional scenario, the only way to update the firmware would be via firmware updates implemented by end users. However, since historically the firmware update adoption rate is low, many imaging devices continue operating using old firmware versions. By using the disclosed mechanism of pushing updates via supply items, over time, all (or nearly all) of customers' imaging devices can be updated.

In certain implementations, updating a firmware variable of the imaging device based on the update information may comprise changing the firmware variable when a condition is met.

In certain implementations, the update information further comprises an update version value, wherein updating the firmware variable of the imaging device based on the update information comprises: when the update version value indicates a newer version than the version value of the firmware variable, updating the firmware variable to match the update value. In certain implementations, updating the firmware variable of the imaging device based on the update information further comprises: comparing the update version value with a version value of the firmware variable. In certain implementations, the imaging device performs the comparing of the update version value with a version value of the firmware variable.

In certain implementations, the update information further comprises an update version value, wherein updating the firmware variable of the imaging device based on the update information comprises: when the update version value is greater than the version value of the firmware variable, updating the firmware variable to match the update value. A greater version value indicates a newer version.

In certain implementations, the method further comprises: updating the version value of the firmware variable to match the update version value when the firmware variable is updated to match the update value.

In certain implementations, updating the firmware variable of the imaging device based on the update information further comprises: when the update version value does not indicate a newer version than the version value of the imaging device, retaining the firmware variable unchanged. This means that if an older generation of supply item is used in an updated imaging device, then the updates previously performed will not be undone.

In certain implementations, updating the firmware variable of the imaging device based on the update information further comprises: when the update version value is not greater than the version value of the imaging device, retaining the firmware variable unchanged.

In certain implementations, the update value may have a format that matches a format of the firmware variable. For example, the update value and the firmware variable may each be an 8-bit field. In certain implementations, one or more of the firmware variable, version value of the firmware, update value and update version value have a binary format, for example, comprise a bit-field and optionally, are an 8-bit field.

In certain implementations, the firmware variable is a compatibility filter. In certain implementations, the update value is a compatibility update filter. In certain implementations, the compatibility filter is a generation compatibility filter configured to control which generations of supply item are classified as compatible with the imaging device. In certain implementations, the update value is a generation compatibility update filter indicating which generations of supply item are compatible with the imaging device. In certain implementations, the compatibility filter is a region compatibility filter configured to control which regions of the world are classified as compatible with the imaging device. In certain implementations, the update value is a compatibility update filter indicating which regions of the world are compatible with the imaging device. In certain implementations, the compatibility filter is a family compatibility filter configured to control which families of devices and/or supply items are classified as compatible with the imaging device. In certain implementations, the update value is a compatibility update filter indicating which families of devices and/or supply items are compatible with the imaging device.

In certain implementations, the firmware variable is a mask, for example, a bitmask. The firmware may be configured to use a bitwise AND of the compatibility filter with a value, such as a generation/region/family identifier from a supply item to determine if the supply is compatible. The term "generation" may refer to year, month, or any other production time interval as deemed appropriate. In this disclosure, the terms "Generation" and "Year" are used interchangeably.

In certain implementations, the firmware variable is a function status variable configured to control the status of one or more functions. The status of a function may be set to one of "enabled" in which the firmware is configured to carry out the function and "disabled" in which the firmware is configured to not carry out the function. The enabled or disabled statuses may be indicated by a 1 or 0 respectively when the function status variable is a bit field.

In certain implementations, the one or more functions are stored on the imaging device. In this way, in order to update the functionality of the imaging device, only a variable needs to be updated, and no new functions need to be sent to and installed on the imaging device. This reduces the amount of data to be sent to the imaging device and is a more efficient way to update the functionality of the imaging device.

In certain implementations, a function of the one or more functions is an authentication function, configured to determine the authenticity of a supply item when connected to the imaging device. In certain implementations, a function of the one or more functions is an enhancement to print speed, print quality, scan speed, scan quality, software fax (fax over the Internet), OCR function on scanner, scan to email and/or a secure check printing feature. For example, an MICR (magnetic ink character recognition) cartridge could cause the imaging device to enable a secure check printing feature.

In certain implementations, the update information is included in a signed certificate. In certain implementations, the method further comprises verifying the signed certificate. The step of verifying may occur before updating the firmware variable of the imaging device based on the update information and/or before reading the update information from the signed certificate.

There is further provided an imaging device, the imaging device comprising firmware and a memory, the memory storing a firmware variable, wherein the firmware is configured to read the firmware variable, and the imaging device is configured to update the firmware variable, by: receiving update information from a memory of a supply item connected to the imaging device, the update information comprising an update value, and updating the firmware variable of the imaging device based on the update information.

In certain implementations, updating a firmware variable of the imaging device based on the update information may comprise changing the firmware variable when a condition is met.

In certain implementations, the imaging device memory further stores a version value of the firmware variable, and the update information further comprises an update version value, and updating the firmware variable of the imaging device based on the update information comprises: when the update version value indicates a newer version than the version value of the firmware variable, updating the firmware variable to match the update value. In certain implementations, updating the firmware variable of the imaging device based on the update information further comprises: comparing the update version value with a version value of the firmware variable.

In certain implementations, the imaging device memory further stores a version value of the firmware variable, and the update information further comprises an update version value, and updating the firmware variable of the imaging device based on the update information comprises: when the update version value is greater than the version value of the firmware variable, updating the firmware variable to match the update value. A greater version value indicates a newer version.

In certain implementations, updating the firmware variable of the imaging device based on the update information further comprises: updating the version value of the firmware variable to match the update version value when the firmware variable is updated to match the update value.

In certain implementations, updating the firmware variable of the imaging device based on the update information further comprises: when the update version value does not indicate a newer version than the version value of the imaging device, retaining the firmware variable unchanged.

In certain implementations, updating the firmware variable of the imaging device based on the update information further comprises: when the update version value is not greater than the version value of the firmware variable, retaining the firmware variable unchanged.

In certain implementations, the update value may have a format that matches a format of the firmware variable. For example, the update value and the firmware variable may each be an 8-bit field. In certain implementations, one or more of the firmware variable, version value of the firmware, update value and update version value have a binary format, for example, comprise a bit-field and optionally, are an 8-bit field.

In certain implementations, the firmware variable is a compatibility filter. In certain implementations, the update value is a compatibility update filter. In certain configurations, the compatibility filter is a generation compatibility filter configured to control which generations of supply item are classified as compatible with the imaging device. In certain implementations, the update value is a generation compatibility update filter indicating which generations of supply item are compatible with the imaging device. In certain implementations, the compatibility filter is a region compatibility filter configured to control which regions of the world are classified as compatible with the imaging device. In certain implementations, the update value is a compatibility update filter indicating which regions of the world are compatible with the imaging device. In certain implementations, the compatibility filter is a family compatibility filter configured to control which families of devices and/or supply items are classified as compatible with the imaging device. In certain implementations, the update value is a compatibility update filter indicating which families of devices and/or supply items are compatible with the imaging device.

In certain implementations, the firmware variable is a mask, for example, a bitmask. The firmware may be configured to use a bitwise AND of the compatibility filter with a value, such as a generation/region/family identifier from a supply item to determine if the supply is compatible. In certain implementations, the firmware variable is a function status variable configured to control the status of one or more functions. The status of a function of the one or more functions may be set to one of "enabled" in which the firmware is configured to carry out the function and "disabled" in which the firmware is configured to not carry out the function.

In certain implementations, the one or more functions are stored on the imaging device.

In certain implementations, a function of the one or more functions is an authentication function, configured to determine the authenticity of a supply item when connected to the imaging device. In certain implementations, a function of the one or more functions is an enhancement to print speed, print quality, scan speed, scan quality, software fax (fax over the Internet), OCR function on scanner, scan to email and/or a secure check printing feature. For example, an MICR (magnetic ink character recognition) cartridge could cause the imaging device to enable a secure check printing feature.

In certain implementations, the update information is included in a signed certificate.

In certain implementations, the imaging device is configured to verify the signed certificate. In certain implementations, the imaging device is configured to verify the signed certificate before updating the firmware variable of the imaging device based on the update information and/or before reading the update information from the signed certificate.

There is further provided an imaging device supply item, the supply item comprising a memory, the memory storing update information, the update information comprising an update value, and the supply item being configured to send the update information to an imaging device.

In certain implementations, the update information further comprises an update version value.

In certain implementations, the supply item is configured to send the update information to the imaging device when the supply item receives a corresponding request from the imaging device, or when the supply item is first connected to the imaging device.

In certain implementations, the supply item is further configured to compare the update version value with a version value received from the imaging device and, when the update version value is greater than the imaging device version value, to send the update value to the imaging device.

There is further provided, an imaging system comprising the imaging device described above and the supply item described above.

There is further provided, a method for updating an electronic device, the method comprising: receiving, by the electronic device, update information from a memory of a supply item connected to the electronic device, the update information comprising an update value, and updating a firmware variable of the electronic device based on the update information.

In certain configurations, the update information further comprises an update version value, wherein updating the firmware variable of the electronic device based on the update information comprises: when the update version value indicates a newer version than the version value of the firmware variable, updating the firmware variable to match the update value.

In certain configurations, updating the firmware variable of the electronic device based on the update information further comprising: when the update version value does not indicate a newer version than the version value of the firmware variable, retaining the firmware variable unchanged.

In certain configurations, the firmware variable is a compatibility filter. In certain implementations, the update value is a compatibility update filter. In certain configurations, the compatibility filter is a generation compatibility filter configured to control which generations of supply item are classified as compatible with the electronic device. In certain implementations, the update value is a generation compatibility update filter indicating which generations of supply item are compatible with the electronic device. In certain implementations, the compatibility filter is a region compatibility filter configured to control which regions of the world are classified as compatible with the electronic device. In certain implementations, the update value is a compatibility update filter indicating which regions of the world are compatible with the electronic device. In certain implementations, the compatibility filter is a family compatibility filter configured to control which families of devices and/or supply items are classified as compatible with the electronic device. In certain implementations, the update value is a compatibility update filter indicating which families of devices and/or supply items are compatible with the electronic device.

In certain implementations, the electronic device is configured to activate features based on region, generation and/or family of the supply item.

In certain configurations, the firmware variable is a function mask status variable configured to control the status of one or more functions.

In certain configurations, the one or more functions are stored on the electronic device.

In certain configurations, a function of the one or more functions is an authentication function, configured to determine the authenticity of a supply item when connected to the electronic device.

In certain configurations, the update information is included in a signed certificate.

There is further provided, an electronic device, the electronic device comprising firmware and a memory, the memory storing a firmware variable, wherein the firmware is configured to read the firmware variable, and the electronic device is configured to update the firmware variable, by: receiving update information from a memory of a supply item connected to the electronic device, the update information comprising an update value, and updating the firmware variable of the electronic device based on the update information.

In certain configurations, the electronic device memory further stores a version value of the firmware variable, and the update information further comprises an update version value and updating the firmware variable of the electronic device based on the update information comprising: when the update version value indicates a newer version than the version value of the firmware variable, updating the firmware variable to match the update value.

In certain configurations, updating the firmware variable of the electronic device based on the update information further comprising: when the update version value does not indicate a newer version than the version value of the firmware variable, retaining the firmware variable unchanged.

In certain configurations, the firmware variable is a compatibility filter. In certain implementations, the update value is a compatibility update filter. In certain implementations, the compatibility filter is a generation compatibility filter configured to control which generations of supply item are classified as compatible with the electronic device. In certain implementations, the update value is a generation compatibility update filter indicating which generations of supply item are compatible with the electronic device. In certain implementations, the compatibility filter is a region compatibility filter configured to control which regions of the world are classified as compatible with the electronic device. In certain implementations, the update value is a compatibility update filter indicating which regions of the world are compatible with the electronic device. In certain implementations, the compatibility filter is a family compatibility filter configured to control which families of devices and/or supply items are classified as compatible with the electronic device. In certain implementations, the update value is a compatibility update filter indicating which families of devices and/or supply items are compatible with the electronic device.

In certain implementations, the electronic device is configured to activate features based on region, generation and/or family of the supply item.

In certain configurations, the firmware variable is a function status variable configured to control the status of one or more functions.

In certain configurations, the one or more functions are stored on the electronic device.

In certain configurations, a function of the one or more functions is an authentication function, configured to determine the authenticity of a supply item when connected to the electronic device.

In certain configurations, the update information is included in a signed certificate.

There is further provided an electronic device supply item, the supply item comprising a memory, the memory storing update information, the update information comprising an update value, and the supply item being configured to send the update information to an electronic device.

In certain configurations, the update information further comprises an update version value.

In certain configurations, the supply item is further configured to compare the update version value with a version value received from the electronic device and, when the update version value indicates a newer version than the version value of the firmware variable, to send the update value to the electronic device.

There is further provided an electronic system comprising the electronic device of as described above and the supply item as described above.

The methods, imaging devices, supply items and systems described above may be employed in any combination. The optional features described above are equally applicable to all of the described methods, imaging devices, supply items and systems and are not limited to the particular method/imaging device/supply item/system with which they are described. The essential features of any of the methods, imaging devices, supply items and systems described may be optional features of any other methods, imaging devices, supply items and systems described.

From the foregoing disclosure and the following detailed description of various examples, it will be apparent to those skilled in the art that the present disclosure provides a significant advance in the art of determining the authenticity of a component an electronic system. Additional features and advantages of various examples will be better understood in view of the detailed description provided below.

BRIEF DESCRIPTION OF THE DRAWINGS

The above-mentioned and other features and advantages of the present disclosure, and the manner of attaining them, will become more apparent and will be better understood by reference to the following description of examples taken in conjunction with the accompanying drawings. Like reference numerals are used to indicate the same element throughout the specification.

DETAILED DESCRIPTION OF THE DRAWINGS

It is to be understood that the disclosure is not limited to the details of construction and the arrangement of components set forth in the following description or illustrated in the drawings. The disclosure is capable of other examples and of being practiced or of being carried out in various ways. For example, other examples may incorporate structural, chronological, process, and other changes. Examples merely typify possible variations. Individual components and functions are optional unless explicitly required, and the sequence of operations may vary. Portions and features of some examples may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that examples of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps or combinations of special purpose hardware and computer instructions.

Disclosed are example systems and methods for updating an electronic system, such as an imaging/printing system.

Figure 1:
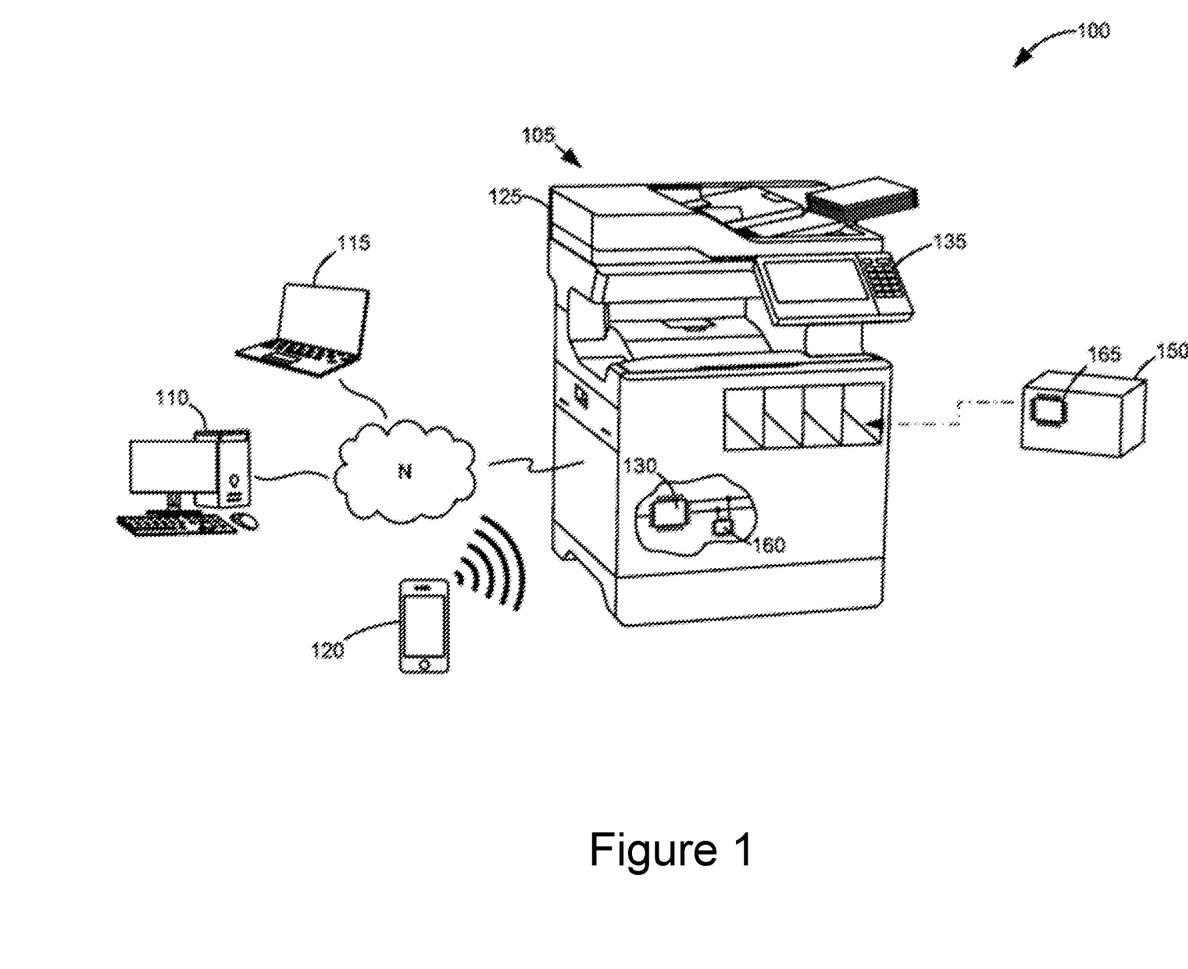
FIG. 1 is a diagrammatic view of an imaging system.

Referring to FIG. 1, there is shown a diagrammatic view of an imaging system 100 used in association with the present disclosure. Imaging system 100 includes an imaging device 105 used for printing images on sheets of media. Image data of the image to be printed on a media sheet may be supplied to imaging device 105 from a variety of sources such as a computer 110, laptop 115, mobile device 120, scanner 125 of the imaging device 105, or like computing device. The sources directly or indirectly communicate with imaging device 105 via wired and/or wireless connections.

Imaging device 105 includes an imaging device component 130 and a user interface 135. Imaging device component 130 may include a processor and associated memory. In some examples, imaging device component 130 may be formed as one or more Application Specific Integrated Circuits (ASICs) or System-on-Chip (SoCs). Memory may be any memory device which stores data and may be used with or capable of communicating with processor. For example, memory may be any volatile or non-volatile memory or combination thereof such as, for example, random access memory (RAM), read-only memory (ROM), flash memory and/or non-volatile RAM (NVRAM) for storing data. Optionally, imaging device component 130 may control the processing of print data. Optionally, imaging device component 130 may also control the operation of a print engine during printing of an image onto a sheet of media.

In one example, imaging device 105 may employ an electronic authentication scheme to authenticate consumable supply items and/or replaceable units installed in imaging device 105. In FIG. 1, a representative consumable supply item/replaceable item, such as a toner cartridge 150, is shown (other consumable/replaceable supply items can equally be used in addition or instead, such as imaging units and fusers). Supply item 150 may be installed in a corresponding storage area in imaging device 105. To perform authentication of supply item 150, imaging device 105 may utilize an imaging device security device 160 incorporated in imaging device 105 and a supply item security device 165 of supply item 150.

In one example, imaging device security device 160 in imaging device 105 may be similar to or the same as supply item security device 165 in consumable supply item 150. Optionally, the imaging device security device 160 may be programmed differently from supply item security device 165. Imaging device security device 160 and supply item security device 165 may operate in conjunction with one another to perform authentication functions, as will be explained in greater detail below.

In an example method, the compatibility of supply items is managed by updating the imaging device. This example method will be described with reference to FIG. 2.

Figure 2:
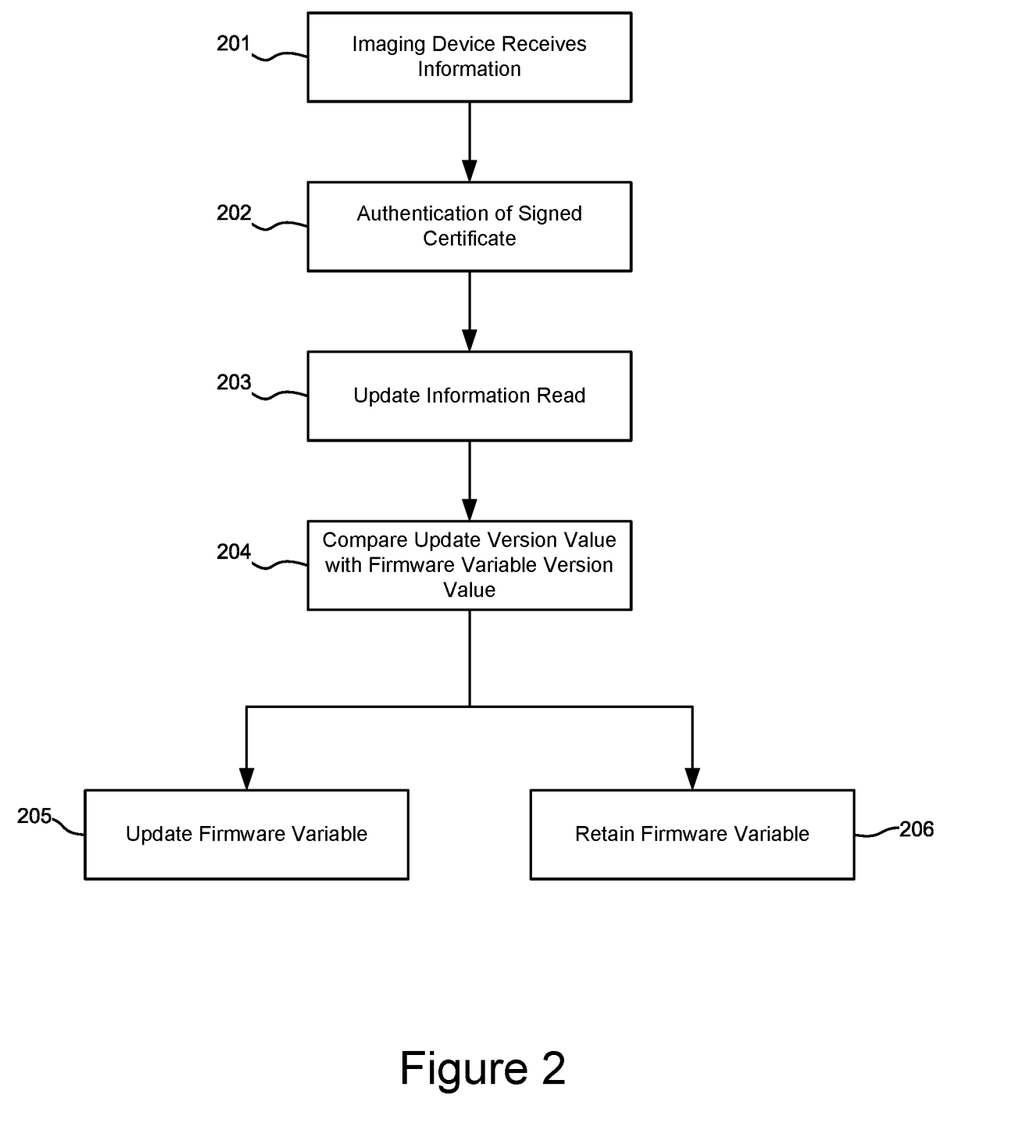
FIG. 2 is a flow chart showing a method of updating an imaging device.

The imaging device has a memory storing a firmware variable and a version value of the firmware variable. The firmware variable is a compatibility filter configured to control which generations of supply item are classified as compatible with the imaging device. The compatibility filter is a bitmask. The firmware may be configured to use a bitwise AND of the compatibility filter with a generation value from a supply item to determine if the supply is compatible. In this way, each bit of the compatibility filter determines if a particular generation of supply item is compatible with the imaging device. This bit field signifies all generations of supplies that are allowed in the imaging device, with each bit of the field denoting a supply item generation. For example, Bit 0 might denote Generation 0, Bit 1=Generation 1, and so on. In this case, a compatibility filter of 11110000 would determine generations one to four to be incompatible and generations five to eight to be compatible. The version value of the firmware variable denotes the current version of the imaging device's compatibility filter. The version value cannot be decremented except via an update to the imaging device firmware.

The imaging device 105 receives a signed certificate containing update information from a memory of the supply item 150 connected to the imaging device at step 201. The signed certificate also includes a generation value which denotes the generation(s) of the supply in the form of a bit field. For example, Bit 0 might denote Generation 0, Bit 1=Generation 1, and so on. Typically, only one bit is set to designate the generation, but this does not have to be the case.

The update information includes an update value which is a bit field indicating all generations of supplies that should be acceptable to the imaging device. The update information also includes an update version value indicating the version of the supply item's update value. The imaging device will compare this version value against the current firmware version value to determine if the imaging device should update its firmware variable with the update value from the supply.

At step 202, the imaging device security device verifies whether the signed certificate is authentic. When the signed certificate is determined to be authentic, the update information is read from the signed certificate at step 203. The update information includes an update value and an update version value. The update value is a compatibility update filter indicating which generations of supply item are compatible with the imaging device. The update value and the compatibility filter are each an 8-bit field. The imaging device reads the supply item generation value, update value and update version value from the signed certificate. In other embodiments, the update information and/or the generation value may not be included in a signed certificate and may be stored on the supply item by other means.

The imaging device compares the generation value with the compatibility filter to determine whether the supply is compatible. The supply item 150 is rejected if there are no matching "1" bits for a given bit position in each field (I.e., if the logical AND of compatibility filter and supply item generation value=0).

At step 204, the imaging device compares the update version value with the version value of the compatibility filter.

At step 205, when the update version value indicates a newer version than the version value of the compatibility filter, the compatibility filter is updated to match the update value and the version value of the compatibility filter is updated to match the update version value. In this way, when the update value is a newer iteration of the compatibility filter, than the version stored on the imaging device, the compatibility filter is updated. In this embodiment, the version values increase from older versions to newer versions, so a newer version has a higher numerical value than an older version. As such, if the update version value is greater than the version value of the firmware, then the compatibility filter will be updated.

At step 206, when the update version value does not indicate a newer version than the version value of the imaging device, the compatibility filter is retained unchanged. In this example, when the update version value is not greater than the version value of the compatibility filter, the compatibility filter remains unchanged.

The updates to the firmware variable and firmware version value at step 205 are persistent across imaging device power cycles.

In one example, all parameters in this example are 8 bits in length. For the firmware variable and compatibility filter and supply item generation values, the LSB (Bit 0) represents Year 0, Bit 1=Year 1, and so on. So, for example, a supply item manufactured in Year 3 has its generation value set to 0x08 (00001000).

The production lifetime for a given imaging device family may be three years, but that of the supply items may be 15 years. The desire is for all imaging devices to initially accept all generations (current and future) of supply items. Therefore, in manufacturing, all imaging devices are configured with compatibility filters=0xFF (11111111).

Then, at the beginning of Year 6 (around three years after shutdown of imaging device production), a decision is made to "roll" the supplies, and begin having imaging devices become incompatible with supply items made in Years 0-2. The rationale is that after the three years have passed since the last supply from Year 2 was manufactured, there should not be any supply items from Years 0-2 remaining in stock for purchase by the end user. Therefore, while users of inauthentic supply items (counterfeits) from Years 0-2 may see errors after an imaging device update, there should be no impact to users of legitimate supply items (which by this time should be Year 3 or later).

Supply items manufactured in Year 6 onwards are given the update value of 0xF8 (11111000) and incrementing the update version value to 0x02 (00000010). Imaging devices in which these supply items are installed will in turn update their compatibility filter to 0xF8 (11111000) so that they will subsequently reject any supplies from Years 0-2.

In a modified version of the above-described example shown in FIG. 2, the compatibility filter is a region compatibility filter configured to control which supply items are compatible with the imaging device based on the region of the world in which they were manufactured, rather than a generation compatibility filter.

The imaging device has a memory storing a firmware variable and a version value of the firmware variable. The firmware variable is a bitmask region compatibility filter. The firmware may be configured to use a bitwise AND of the region compatibility filter with a region value from a supply item to determine if the supply is compatible. In this way, each bit of the compatibility filter determines if a particular region of supply items are compatible with the imaging device. Each bit of the field denotes a supply item region. For example, Bit 0 might denote USA, Bit 1=Canada, Bit 2=Mexico, Bit 3=UK, Bit 4=Western Europe, Bit 5=Eastern Europe, Bit 6=Asia, Bit 7=Rest of World. In this case, a compatibility filter of 11110000 would determine USA, Canada, Mexico, UK to be incompatible and Western Europe, Eastern Europe, Asia and the Rest of World to be compatible. The version value of the firmware variable denotes the current version of the imaging device's region compatibility filter. The version value cannot be decremented except via an update to the imaging device firmware.

The imaging device 105 receives a signed certificate containing update information from a memory of the supply item 150 connected to the imaging device at step 201. The signed certificate also includes a region value which denotes the region(s) of the supply in the form of a bit field.

The update information includes an update value which is a bit field indicating all regions that should be acceptable to the imaging device. The update information also includes an update version value indicating the version of the supply item's update value. The imaging device will compare this version value against the current firmware version value to determine if the imaging device should update its firmware variable with the update value from the supply.

The imaging device security device verifies whether the signed certificate is authentic. When the signed certificate is determined to be authentic, the update information is read from the signed certificate. The update information includes an update value and an update version value. The update value is a region compatibility update filter. The update value and the compatibility filter are each an 8-bit field. The imaging device reads the supply item region value, update value and update version value from the signed certificate. In other embodiments, the update information and/or the region value may not be included in a signed certificate and may be stored on the supply item by other means.

The imaging device compares the region value with the region compatibility filter to determine whether the supply is compatible. The supply item 150 is rejected if there are no matching "1" bits for a given bit position in each field (I.e., if the logical AND of compatibility filter and supply item generation value=0).

In one example, the imaging device might initially be configured to accept a cartridge from any region (with a region compatibility filter of 11111111). The updates may then restrict the regions which are compatible as determined by the first supply item used. For example, a supply item sold in the USA might configure the imaging device to accept supply items from only USA, Canada, or Mexico. This further level of security may enable more effective detection of inauthentic supply items which may have another or no region value. A supply item sold in Mexico might allow cartridges from Mexico, USA, or Central America. In another example method, the functionality of the imaging device 105 is managed by updating the imaging device. This example method will be described with reference to FIG. 3.

Figure 3:
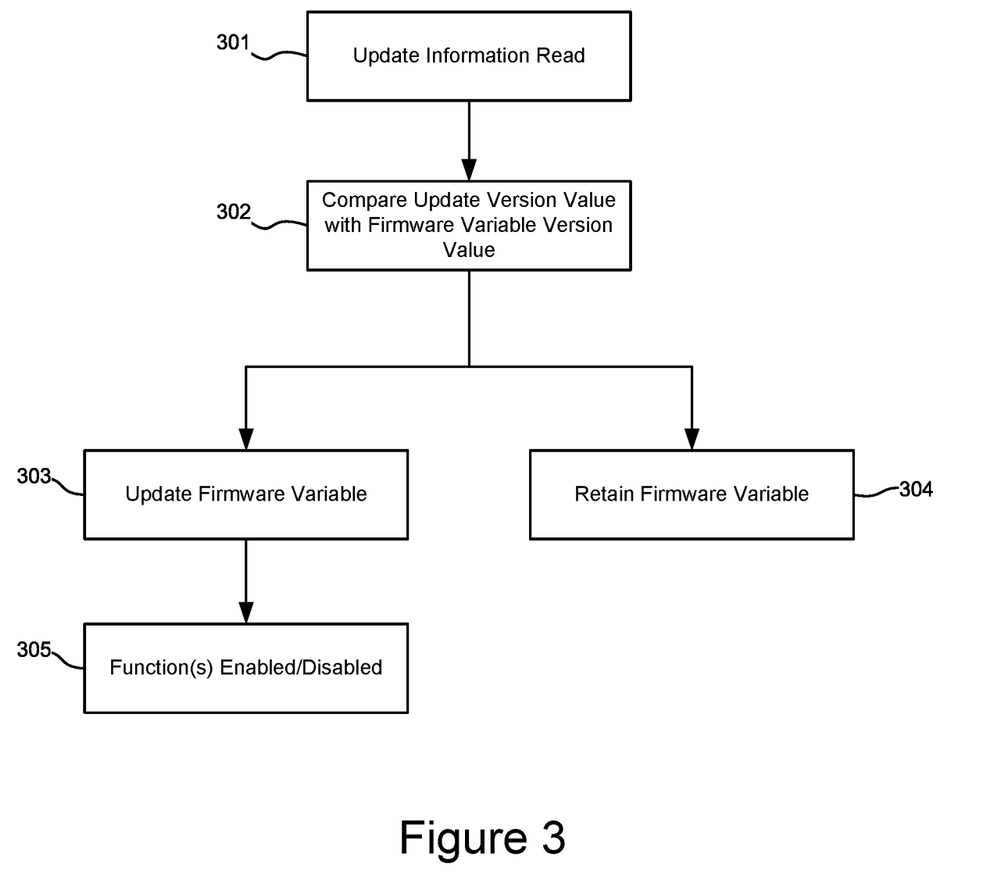
FIG. 3 is a flow chart showing another method of updating an imaging device.

The imaging device 105 has a firmware variable which is a function status variable configured to control the status of one or more functions. The function status variable is a bit field which is used as a selector to control the deployment of certain functions in the imaging device. Each function is stored in the imaging device and is activated if its corresponding bit in the function status variable field is set.

For example, Function 1 may be activated if bit 1 is set to 1, Function 2 if bit 2 is set to 1, and so on. The function status variable version value denotes the current version of the function status variable.

The supply item stores update information which includes an update value which is used to update the function status variable in the imaging device. The update information also includes an update version value which denotes the version of the update value in the supply item.

In step 301, when the supply item is installed, the imaging device reads the update information from the supply item. These parameters may be included in a signed certificate and steps 201 and 202 may be carried out, but this does not have to be the case.

In step 302, the imaging device compares the version value of the firmware function status variable with the update version value read from the supply item.

When the update version value indicates a newer version than the version value of the function status variable, the function status variable is updated to match the update value and the version value of the function status variable is updated to match the update version value as occurs in step 303. The updates to the function status variable and the version value of the function status variable are persistent across imaging device power cycles. In this example, when the update version value is greater than the version value of the function status variable, the function status variable is updated to match the update value.

In step 304, when the update version value does not indicate a newer version than the version value of the firmware variable, the function status variable is retained unchanged. In this example, when the update version value is not greater than the version value of the function status variable, the function status variable remains unchanged.

In step 305, any functions indicated to be enabled by the updated function status variable are enabled.

In one example of the method of FIG. 3, the function status variable, the version value of the function status variable, the update value and the update version value are all 8 bits in length. For the function status variable and the update value, the LSB (Bit 0) represents Function 0, Bit 1=Function 1, and so on.

None of the functions with statuses indicated by the function status variable are enabled in the imaging device initially. Therefore, in manufacturing, all imaging devices are configured with FE=0x00 (00000000).

Similarly, supply items are initially programmed such that the update value is 0x00. The version value of the function status variable and the update version value are both initially set to 0x01.

Some time later (for example, three years after manufacture of the imaging device has ended), there is a desire to activate Functions 0 and 2 associated with the function status variable. In the traditional scenario, the only way to accomplish this would be via firmware updates to end users.

The update value of new supply items is then set to 0x05 (00000101), and the update version value of the new supply items is set to 0x02 (00000010) during supply item manufacturing. Imaging devices in which these supplies are installed will in turn update their function status variables from 0x00 to 0x05 and subsequently activate Functions 0 and 2.

Some of the functions managed by the function status variable may be used to authenticate the supply devices using cryptographic operations.

For example, one authentication function uses the ECDSA to sign data provided by the host. The host generates random data and sends it to the supply to be authenticated. The supply item signs the data with its private key and returns the signature to the host. The host verifies the signature using the corresponding public key. The supply item is considered authentic if the signature verification is successful and non-authentic otherwise. Using this function, the supply provides proof that it has possession of the private key and is thus authentic.

Enabling these authentication functions through the disclosed function management allows the functions to exist in the imaging device in an inactive state. An entity making a counterfeit supply item may not implement the function because it is not initially required for operation. If the counterfeiter does implement the function, it may not be implemented correctly because it cannot be tested by operation of the imaging device. The chances of the function working correctly in a counterfeit device when subsequently enabled are therefore lower.

The imaging device may periodically execute a randomly selected function on each supply item. The functions are selected by those currently enabled by the function status variable. Each supply should support the enabled functions and a supply is determined to be non-authentic if it does not. Note that a supply item can contain an update certificate to disable a deprecated function that the supply does not support. This makes it safe for the host to require all enabled functions to be supported by the supplies.

In one embodiment, the imaging device contains a security chip that verifies the authenticity of the supply devices. The security chip has protections against tampering, reverse engineering, and code extraction. The security device manages the supply item compatibility and function updates described above. The security device also randomly selects the function to execute, generates the data needed for the command, and verifies the response from the supply to authenticate it. The host SoC is oblivious to which functions are enabled or executed.

The data communications with the supply items may be encrypted. In this case, the host initializes a session with each supply item to establish a session key that is used to encrypt the data for that supply. The encryption provides data confidentiality, but anyone could observe the length of the data transfers between the host and supplies and the functions may require different amounts of data. To keep someone from determining the function being executed by the length of the transferred data, the data communications for the managed functions may use a fixed data length. The data required for each function is padded to the fixed length. The host timing is also kept consistent to not reveal the function by the command timing.

The host may send to the supply item random data of a first fixed length. The supply responds with the function specific result padded to a second fixed length with random data.

The supply items may contain hardware to do some of the cryptographic operations required for authentication. For example, the ECDSA authentication function may be done using an elliptic-curve cryptography coprocessor. The specific-purpose hardware usually operates much faster than carrying out the same function on a small, low-power general-purpose processor such as those on the supplies. To prevent a counterfeiter from implementing the function in software, the host may impose a time limit for the supply to provide a response.

The security chip may perform the timing. For commands with a time limit, a countdown timer is started when the security chip has finished generating the data for the supply. When the security chip receives the response from the supply, it checks if the selected function has a time limit. If the function does have a time limit, then the security device checks if the timer has expired. The response from the supply is considered invalid if the timer has expired or if the response is incorrect.

In addition to being updated by the memory contents of a supply item, the compatibility and update fields may be updated by including an update certificate in the imaging device firmware. When the host contains a security chip, the SoC firmware sends the update certificate to the security chip.

Relatively apparent advantages of the many embodiments include, but are not limited to, a more reliable method of updating an electronic system or device.

It will be understood that the example applications described herein are illustrative and should not be considered limiting. It will be appreciated that the actions described and shown in the example flowcharts may be carried out or performed in any suitable order. It will also be appreciated that not all of the actions described in FIG. 3 need to be performed in accordance with the example embodiments of the disclosure and/or additional actions may be performed in accordance with other example embodiments of the disclosure.

Many modifications and other embodiments of the disclosure set forth herein will come to mind to one skilled in the art to which these disclosures pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Further disclosure is provided below.

Statement 1: A method for updating an electronic device, the method comprising: receiving, by the electronic device, update information from a memory of a supply item connected to the electronic device, the update information comprising an update value, and updating a firmware variable of the electronic device based on the update information.

Statement 2: The method of statement 1, wherein the update information further comprises an update version value, wherein updating the firmware variable of the electronic device based on the update information comprises: when the update version value indicates a newer version than the version value of the firmware variable, updating the firmware variable to match the update value.

Statement 3: The method of statement 2, wherein updating the firmware variable of the electronic device based on the update information further comprises: when the update version value does not indicate a newer version than the version value of the firmware variable, retaining the firmware variable unchanged.

Statement 4: The method of statement 1, wherein the firmware variable is a compatibility filter configured to control which generations of supply item are classified as compatible with the electronic device and the update value is a compatibility update filter indicating which generations of supply item are compatible with the electronic device.

Statement 5: The method of statement 1, wherein the firmware variable is a function mask status variable configured to control the status of one or more functions.

Statement 6: The method of statement 5, wherein the one or more functions are stored on the electronic device.

Statement 7: The method of statement 5, wherein a function of the one or more functions is an authentication function, configured to determine the authenticity of a supply item when connected to the electronic device.

Statement 8: The method of statement 1, wherein the update information is included in a signed certificate.

Statement 9: An electronic device, the electronic device comprising firmware and a memory, the memory storing a firmware variable, wherein the firmware is configured to read the firmware variable, and the electronic device is configured to update the firmware variable, by: receiving update information from a memory of a supply item connected to the electronic device, the update information comprising an update value, and updating the firmware variable of the electronic device based on the update information.

Statement 10: The electronic device of statement 9, wherein the electronic device memory further stores a version value of the firmware variable, and the update information further comprises an update version value and updating the firmware variable of the electronic device based on the update information comprises: when the update version value indicates a newer version than the version value of the firmware variable, updating the firmware variable to match the update value.

Statement 11: The electronic device of statement 10, wherein updating the firmware variable of the electronic device based on the update information further comprises: when the update version value does not indicate a newer version than the version value of the firmware variable, retaining the firmware variable unchanged.

Statement 12: The electronic device of statement 9, wherein the firmware variable is a compatibility filter configured to control which generations of supply item are classified as compatible with the electronic device and the update value is a compatibility update filter indicating which generations of supply item are compatible with the electronic device.

Statement 13: The electronic device of statement 9, wherein the firmware variable is a function status variable configured to control the status of one or more functions.

Statement 14: The electronic device of statement 13, wherein the one or more functions are stored on the electronic device.

Statement 15: The electronic device of statement 13, wherein a function of the one or more functions is an authentication function, configured to determine the authenticity of a supply item when connected to the electronic device.

Statement 16: The electronic device of statement 9, wherein the update information is included in a signed certificate.

Statement 17: An electronic device supply item, the supply item comprising a memory, the memory storing update information, the update information comprising an update value, and the supply item being configured to send the update information to an electronic device.

Statement 18: The electronic device supply item of statement 17, wherein the update information further comprises an update version value.

Statement 19: The electronic device supply item of statement 18, wherein the supply item is further configured to compare the update version value with a version value received from the electronic device and, when the update version value indicates a newer version than the version value of the firmware variable, to send the update value to the electronic device.

Statement 20: An electronic system comprising the electronic device of statement 1 and the supply item of statement 17.

What is claimed is:

1. A method for updating an imaging device, the method comprising:
   receiving, by the imaging device, update information from a memory of a supply item connected to the imaging device, the update information comprising a compatibility update filter indicating which generations of supply item are compatible with the imaging device, and
   updating a compatibility filter of the imaging device based on the update information, the compatibility filter configured to control which generations of supply item are classified as compatible with the imaging device,
   wherein the compatibility filter is a mask and
   wherein firmware of the imaging device is configured to use a bitwise AND of the compatibility filter with a generation identifier from a supply item to determine if the supply item is compatible.

2. The method of claim 1, wherein the update information further comprises an update version value,
   wherein updating the compatibility filter of the imaging device based on the update information comprises:
   when the update version value indicates a newer version than the version value of the compatibility filter, updating the compatibility filter to match the compatibility update filter.

3. The method of claim 2, wherein updating the compatibility filter of the imaging device based on the update information further comprises: when the update version value does not indicate a newer version than the version value of the compatibility filter, retaining the compatibility filter unchanged.

4. The method of claim 1, wherein the update information is included in a signed certificate.

5. The method of claim 4, the method further comprising: verifying the signed certificate.

6. The method of claim 5, wherein the step of verifying occurs before reading the update information from the signed certificate.

7. An imaging device, the imaging device comprising firmware and a memory, the memory storing a compatibility filter configured to control which generations of supply item are classified as compatible with the imaging device, wherein the firmware is configured to read the compatibility filter, and the imaging device is configured to update the compatibility filter, by:
   receiving update information from a memory of a supply item connected to the imaging device, the update information comprising a compatibility update filter indicating which generations of supply item are compatible with the imaging device, and
   updating the compatibility filter of the imaging device based on the update information
   wherein the compatibility filter is a mask, and
   wherein firmware of the imaging device is configured to use a bitwise AND of the compatibility filter with a generation identifier from a supply item to determine if the supply item is compatible.

8. The imaging device of claim 7, wherein the imaging device memory further stores a version value of the compatibility filter, and the update information further comprises an update version value, and updating the compatibility filter of the imaging device based on the update information comprises:
   when the update version value indicates a newer version than the version value of the compatibility filter, updating the compatibility filter to match the compatibility update filter.

9. The imaging device of claim 8, wherein updating the compatibility filter of the imaging device based on the update information further comprises: when the update version value does not indicate a newer version than the version value of the compatibility filter, retaining the compatibility filter unchanged.

10. The imaging device of claim 7, wherein the update information is included in a signed certificate.

11. The imaging device of claim 10, the method further comprising: verifying the signed certificate.

12. The imaging device of claim 11, wherein the step of verifying occurs before reading the update information from the signed certificate.

13. An imaging system comprising the imaging device of claim 7 and an imaging device supply item, the supply item comprising a memory, the memory storing update information, the update information comprising a compatibility update filter, and the supply item being configured to send the update information to an imaging device.

* * * * *